Nov. 11, 1947.  E. B. MALLORY  2,430,519
REGENERATIVE DIGESTER
Filed March 19, 1942  2 Sheets-Sheet 2
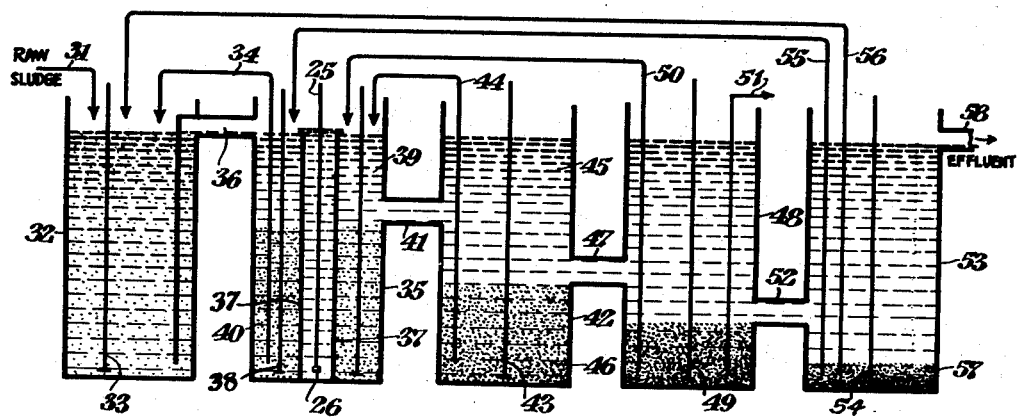
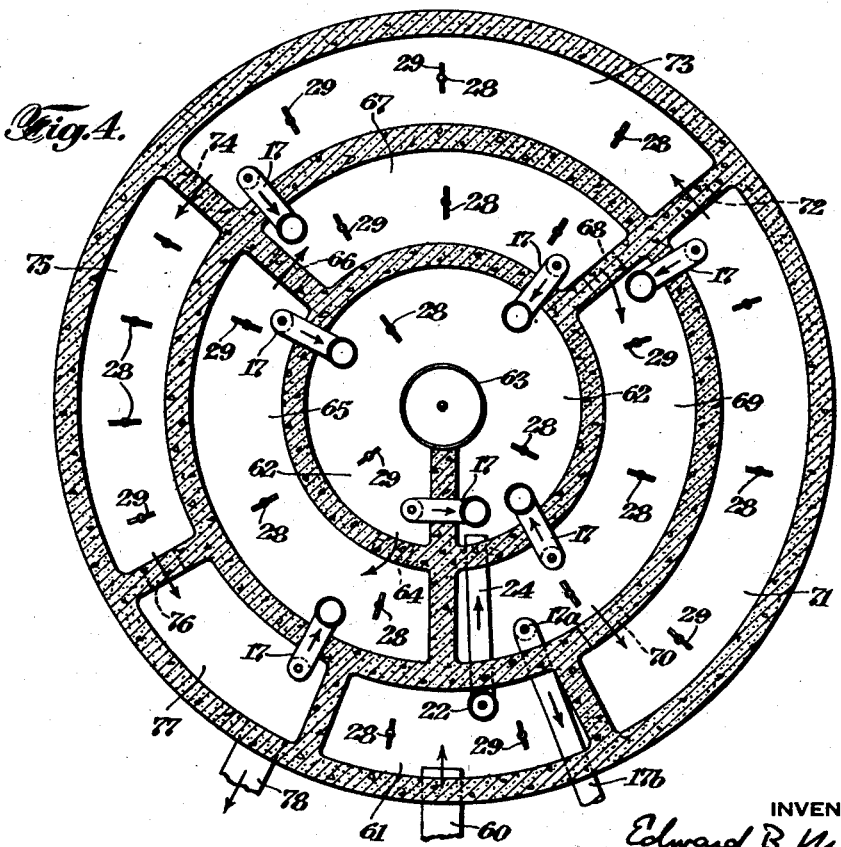
INVENTOR
Edward B. Mallory
BY
Ward Crosby & Neal
ATTORNEYS Patented Nov. 11, 1947

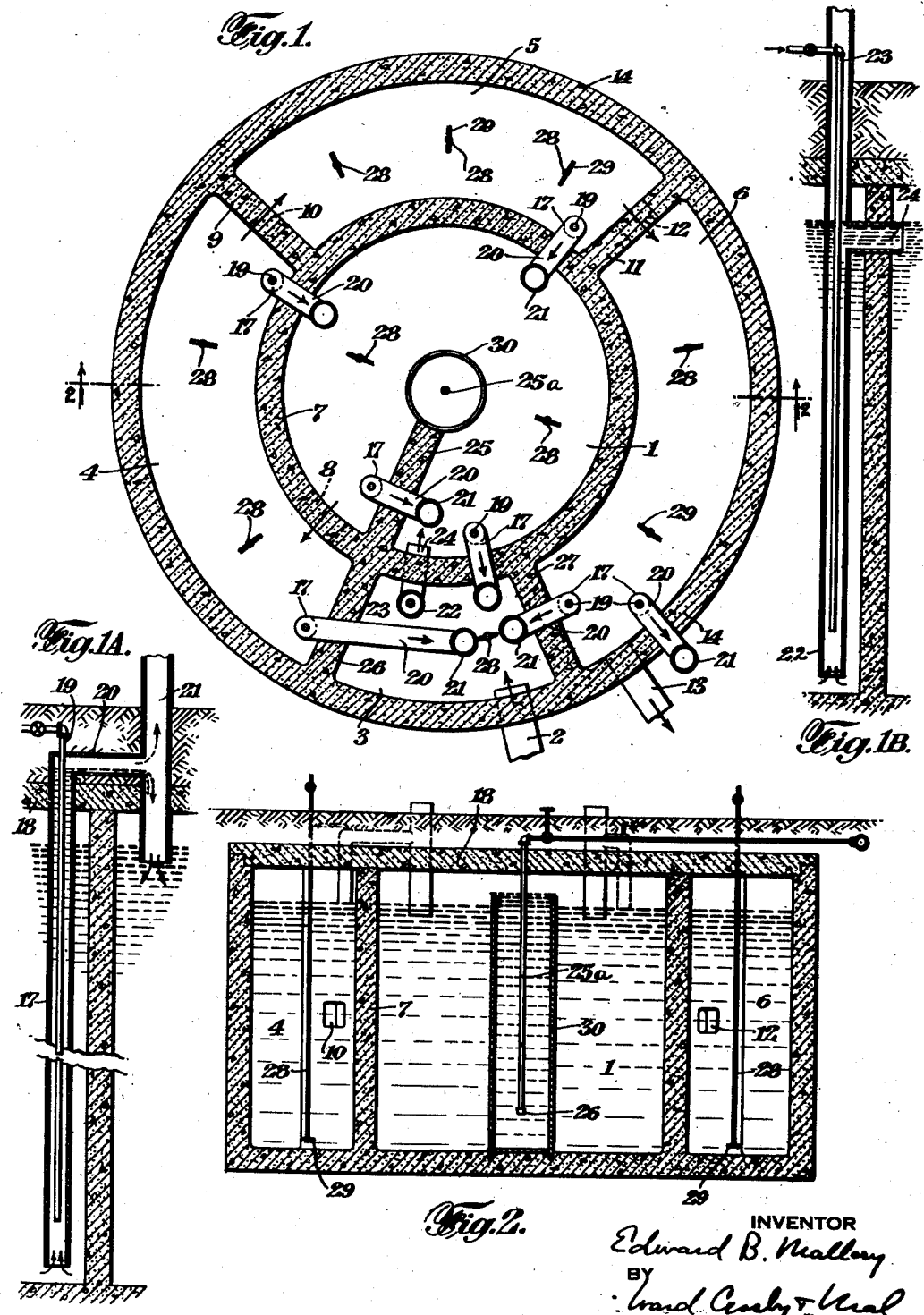

2,430,519

UNITED STATES PATENT OFFICE 2,430,519

REGENERATIVE DIGESTER

Edward B. Mallory, Tenafly, N. J.

Application March 19, 1942, Serial No. 435,549

21 Claims. (Cl. 210—2)

The invention relates to a process and apparatus for the purification by digestion of sludges and similar highly concentrated wastes. In some instances where the raw wastes to be treated are initially of sufficiently concentrated character, the treatment herein referred to may constitute the entire purification treatment, since an effluent may be obtained of sufficient degree of clarification and purification to warrant discharge into receiving waters without creating odors or other nuisances. In other instances where the raw wastes to be treated are initially of less concentrated character and not appropriate for treatment by digestion, the digestion process herein referred to may be applied to sludge produced as a by-product of other purification treatments, such as the heretofore so-called activated sludge process, which are appropriate to the treatment of wastes of low concentration not suitable for treatment by digestion.

For purposes of discussion sewage and industrial wastes having B. O. D. concentrations of less than 500 P. P. M. may be regarded as of low concentration, those having B. O. D. concentrations of from 500 to 3,000 P. P. M. as of medium concentration, and those of from 3,000 up to 50,000 or 60,000 P. P. M. as of high concentration. Particularly in the industrial field, wastes falling in each of the above concentrations are frequently encountered in a single manufacturing plant, and it is practical to segregate the wastes of high concentration from those of low or medium concentration at the point of origin, and to utilize the digestion process herein referred to for the treatment of the wastes of high concentration, and in conjunction with a so-called activated sludge plant for the treatment of the wastes of lower concentration, the excess activated sludge thereby produced being also subjected to the digestion process to dispose thereof. In dairy plants for example highly concentrated wastes such as cheese whey and curd wash waters which are frequently intermittently produced, may be separately collected and fed to the digester, while other incident wastes of medium and lower concentration may be treated by the so-called activated sludge process, the excess oxidized sludge thereby produced being also fed into the digester.

Speaking generally the invention aims to improve the efficiency and rapidity of the process of digestion and to enable the rate of progress of the process to be definitely established and controlled. To this end the invention includes a number of cooperating features involving both process steps and apparatus used to carry out the process, which features are preferably used conjointly although in many instances having independent utility.

According to one phase of the present invention the process of digestion is carried out in successive stages, and sludge which has settled out in a later stage or stages of treatment is recirculated back into admixture with the wastes passing through an earlier stage. This recirculated sludge has a much higher ratio of active organisms to available food supply than the contents of the earlier compartments, recirculation thus serving to increase the aforesaid ratio in the earlier stage, and thereby increase the rate of digestion in such earlier stage. I have found that when recirculated as above set forth the sludge acts both as an accelerator of digestion and as a buffer. It does not encourage excessive volatile acid production which would interfere with digestion, but on the contrary promotes a neutral or alkaline pH in the wastes under treatment. The amounts of activated sludge so recirculated may be regulated, thus affording control of the rate of progress of the process as a whole and in the various stages, in contrast with prior digestion processes wherein the rate of progress of the process has been substantially uncontrolled as evidenced by the varying periods of time required to effect comparable degrees of reduction of the volatile solids in various existing plants of this character, these periods varying from twenty to thirty days up to sixty or ninety days according to prior practice. Also the effluents from prior digesters have been unduly high in objectionable impurities, running from a B. O. D. of about 220 P. P. M. up to 600 or more in many prior digesters, with suspended solids running from about 500 to 3,000 or 4,000 P. P. M.

I have also discovered that the progress of the digestion process as thus carried out in stages is much accelerated and augmented by conducting the operation at a relatively high temperature during an initial stage—substantially higher than according to prior practice in the art, and thereafter conducting subsequent stages at progressively lower temperatures. For example the initial stage of digestion may be carried out at a temperature of about 108° F. to 102° F. I have found that a higher rate of digestion may be initiated and maintained for a short period of time within this temperature range, but that if this high temperature be continued beyond a limited time, longer than a few days for example, a rapid decrease in the rate of digestion takes place. I have also found that an equally rapid rate of digestion may be obtained by continuing the digestion process at a somewhat lower temperature range, for example, between 100° F. and 90° F. A comparable or even higher rate of digestion may be thereafter obtained by operating still later stages of digestion at a lower temperature, for example between 90° and 80° F. I have also found that accelerated rates of digestion may be obtained by controlling the concentration of suspended matter in the digestion system somewhat in parallel with the temperature gradient, so as to provide in successive stages a gradual drop both in temperature and in solids concentration. In actual practice it has been determined that an excess of 99% of the volatile matter in raw sludge may be volatilized or stabilized in relatively short digestion periods of from twelve to twenty days, the suspended solids in effluent running from 50–100 P. P. M.

The progress of the digestion process has been considered to be dependent upon the activity of anaerobic organisms, and heretofore the process has been carried out in so far as possible out of contact with air or oxygen in the belief that the activity of such organisms would be thereby inhibited. I have found however that the digestion process is not inhibited by such aeration or oxidation as is involved in using air-lift devices to recirculate activated sludge as above referred to, and in using air diffusers operating in the treatment compartments to stir and mix the contents thereof. This avoids the need of providing moving mechanical parts for the above purposes, which are expensive and heretofore have been found objectionable or impractical in digesters for other reasons. It is found that such quantities of oxygen as need to be introduced for the above purposes are rapidly dissipated, and that anaerobic conditions are in fact generally maintained.

The present process I believe to depend for its efficacy upon sludge which is in an accurate sense activated, i. e. heavily charged with aerobic and anaerobic activated organisms which break down food products by ingestion and digestion; the above is in contrast with the so-called activated sludge process which I believe to depend primarily upon oxidation of the sludge, with activated organisms playing a minor part. So-called activated sludge as produced in the process commonly so named, is characterized by a high degree of oxidation and dissolved oxygen, activated organisms are present therein only to a minor extent, and conditions compatible with the presence of anaerobic organisms could not be maintained else the sludge would be rendered septic. The activated sludge of the present process on the other hand is oxidized only to a slight extent, it has very little dissolved oxygen, and a high content of activated organisms, the conditions being in general anaerobic.

From the apparatus standpoint the invention in its preferred form includes the use of successive treatment compartments so positioned and related as to promote the establishment and maintenance of a treatment temperature gradient as above referred to, and an improved type of heater which also facilitates the maintenance of such temperature gradient and promotes the efficiency of the transfer of heat from the heating medium.

The invention is disclosed herein as carried out by certain preferred forms of apparatus but from the standpoint of the invention in its broader aspects the disclosure should be understood as being merely illustrative of the principles of the invention. In the drawings—

Fig. 1 is a horizontal section through one form of apparatus constructed to operate in accordance with the invention;

Figs. 1A and 1B are detail elevations of forms of air-lift devices used in the apparatus of Fig. 1.

Fig. 2 is a central vertical section of the apparatus shown in Fig. 1.

Fig. 3 is a schematic view illustrating successive stages of operation of the digestion process.

Fig. 4 is a view similar to Fig. 1 but showing a somewhat modified form of apparatus.

In Fig. 1 the invention is shown as applied to a digester having a treatment compartment 1 in which takes place what I refer to hereinafter as the initial or high temperature stage of digestion although as later more fully described, the incoming sludge to be treated preferably flows from an intake conduit 2 through a pre-treatment or mixing chamber 3 in which the process of digestion may proceed to some extent before passing into the high temperature digestion compartment 1. In the apparatus shown in Figs. 1 and 2 the waste under treatment after passing through the initial treatment compartment 1, is subjected to three successive and subsequent stages of digestion which occur respectively in the compartments 4, 5 and 6. The waste under treatment may flow by gravity through the successive compartments. As shown the enclosing wall 7 of compartment 1, which also forms the inner wall of compartments 3, 4, 5 and 6, is provided with a port 8 through which the supernatant liquor flows from compartment 1 into compartment 4; a radial wall 9 between compartments 4 and 5 is provided with a port 10 through which the supernatant liquor flows from compartment 4 to compartment 5; a similar radial wall 11 between compartments 5 and 6 is provided with a similar port 12 through which the supernatant liquor may flow from compartment 5 to compartment 6, the successive ports above referred to being preferably located at successively lower levels as later referred to in connection with Fig. 3. Clarified effluent may be discharged from the apparatus through the offtake conduit 13 leading from the final compartment 6 and passing through an annular wall 14 which is common to the compartments which surround the inner initial digestion compartment 1.

For recirculating activated sludge as above referred to I prefer to use air-lift devices indicated generally in Fig. 1 by numeral 17. These devices as shown more in detail in Fig. 1A are provided with an uptake pipe 17 which extends down through a top wall 18 overlying the apparatus, to a point near the bottom of the compartment from which sludge is to be withdrawn. An air supply pipe 19 discharges the air under pressure at a point near the bottom of pipe 17 and the sludge is thus lifted up to a pipe 20 extending laterally from the top of pipe 17 and discharging into a vertical open-ended pipe 21. Thus the open top of pipe 21 serves as an air vent, and sludge to be recirculated flows downwardly through pipe 21 into the compartment into which activated sludge is desired to be recirculated. The upper end of pipe 21 permits the air passing in through pipe 19 to be vented to the outside atmosphere, while the lower end of pipe 21 serves as a seal to prevent the air from mixing with the gases given off within the treatment compartments, which gases occupy the space immediately beneath top wall 18. Also the seal afforded by the lower end of pipe 21 prevents these gases from passing off through pipe 21, in admixture with the air. The gaseous products of digestion will be understood as drawn off from the space beneath top wall 18 for disposal or use, by appropriate means as is usual in the art and which accordingly need not be shown or described in detail.

In Fig. 1B I have shown a specifically different form of air-lift device which may be used to afford a combination of air-lift and gravity flow from the bottom of the mixing compartment 3 into the upper portion of the initial treatment compartment 1. As shown this form of device consists of an open ended vertical pipe 22 which extends down through top wall 18 to a point near the bottom of the mixing compartment 3, an air supply pipe 23 being provided to deliver air under pressure to a point within the lower part of pipe 22. A horizontal pipe 24 extends from pipe 22 through wall 7 at the level of the contents of compartments 1 and 3, and thus as sludge flows into compartment 3 through intake conduit 2, it may flow through pipes 22 and 24 by gravity alone into compartment 1 if air is not being supplied through pipe 23, or with the aid of air-lift effect and aeration if desired.

In the apparatus of Fig. 1 as thus far described sludge flowing in for treatment may pass through the pipes 22 and 24 above described into the entrance portion of compartment 1, which is separated from the delivery portion of such compartment by a radial wall 25 (Fig. 1). As shown in Fig. 1 one of the air-lift devices 17 previously described may be positioned to recirculate sludge from the bottom of compartment 1 back into mixing chamber 3. Another air lift device 17 is shown in Fig. 1 as positioned to recirculate sludge from the delivery portion of compartment 1 through wall 25 and back into the entrance portion of such compartment. The supernatant liquor then passes through port 8 as previously described into the second digestion compartment 4, an air lift device 17 being also shown as positioned to permit the recirculation of sludge from the bottom of compartment 4 through a radial wall 26 into mixing compartment 3. A further air lift device 17 is shown as positioned near the delivery end of compartment 4 to afford recirculation of sludge from the bottom of such compartment back into the compartment 1.

The supernatant liquid then passes from compartment 4 through port 10 into the next successive stage of digestion which takes place in compartment 5. From this compartment an air lift device 17 is shown in Fig. 1 as provided to afford recirculation of activated sludge from compartment 5 through wall 7 and back into compartment 1. From compartment 5 the supernatant liquor overlying the activated sludge which has settled out in the bottom of the compartment, passes through port 12 into the final stage digestion compartment 6. The purified effluent may pass off from the upper portion of compartment 6 through an offtake conduit 13, an air lift device 17 being shown in Fig. 1 to afford recirculation of sludge from the bottom of compartment 6 through a radial wall 27 back into mixing compartment 3. An additional air lift device 17 is also shown in connection with compartment 6, to remove sludge from the system.

I prefer also to provide in the various compartments a number of air diffuser devices indicated generally in Fig. 1 by numeral 28 and consisting as shown in Fig. 2 of vertical pipes 28 having perforated branch pipes 29 extending therefrom near the bottoms of the compartments. These air diffusers are provided primarily for mixing the contents of the compartments and stirring up the sludge from the bottoms thereof when desired. The activated sludge and other suspended matter as delivered into the various compartments above referred to, has a tendency to settle with increasing rapidity in the successive zones, and the thorough stirring or mixing of the contents of the compartments brings greater amounts of colloidal and dissolved solids in the supernatant liquor into contact with the surface areas of the sludge, a desirable procedure which may be accomplished as above stated without the use of moving mechanical parts which are objectionable and impractical in a digester.

The above described air-lift and air diffuser devices also have an aerating effect on the recirculated sludge and other waste under treatment, which effect has heretofore been regarded as incompatible with the digestion process. I have found however that the extent or amount of oxidation involved in carrying out the above purposes in nowise inhibits but may promote the digestion process. The applied oxygen is quite rapidly dissipated and anaerobic conditions generally maintained, in fact the administration of oxygen within the relatively small amounts needed in carrying out the above purposes appears to stabilize or destroy certain intermediate products of digestion such as volatile acids, phages, and enzymes which inhibit the rapidity of progress and completeness of the digestion process. And particularly in a later stage of treatment, for example by supplying air in greater quantities through the diffusers in compartment 5, aeration may be used to break up volatile acids present in the wastes under treatment.

In Figs. 1 and 2 I have indicated a heater 30 which is preferably of a character later described in detail, as located centrally within the digestion compartment 1. The heat supplied should preferably be such as to maintain the wastes passing through compartment 1 within a temperature range between 108° and 102° F. By virtue of the central location of compartment 1 and of the heater 30 within the compartment, and the grouping of the compartments 4, 5 and 6 about compartment 1 in heat exchanging relation therewith, the surrounding compartments 4 to 6 by heat absorption from compartment 1 may be readily maintained at temperatures varying from about 100° F. down to 90° F. or somewhat lower, for the purposes previously described.

The pre-treatment or mixing chamber 3 by heat exchange with adjacent compartments and by recirculation of sludge through the air lift devices discharging into this compartment as above described, promotes the mixing of the raw entering wastes with recirculated activated sludge, and particularly in the case of cold raw wastes raises the temperature thereof to temper the shock of the entering colder wastes upon the contents of compartment 1. In the case of excessively hot entering wastes the chamber 3 may also exert a similar temperature modifying effect.

The tank construction may be of steel or poured concrete, or concrete blocks may be used where cheaper construction is desired, as some degree of porosity in the walls usually is not objectionable. As shown in Fig. 2 the apparatus will usually be appropriately heat insulated, as by installation under ground with a foot or so of earth over the top wall 18 which overlies all compartments. This top wall may be of steel or concrete slab construction.

The heater element 30 is preferably in the form of an upstanding metal tank located centrally in chamber 1 and having substantially vertical side walls, the heat being supplied by steam under pressure passing in through a pipe 25a having a nozzle 26 discharging into the lower portion of tank 30. The tank 30 will contain a body of clear water heated by steam injected into the tank as needed to keep the temperature in chamber 1 within the desired limits, and the condensate may discharge over the upper rim of tank 30 into compartment 1, as indicated in Fig. 2. Such a construction results in substantially 100% efficiency of heat interchange, in contrast with the heating pipes and coils which have previously been used in digesters from which hot water circulated back to the boiler. Also deposits of sludge build up rapidly on the horizontal surfaces of the prior heaters used in digesters, thus reducing further the efficiency of the heat transfer, and in contrast with the vertical heat-exchanging surface of the above described type of heater which does not collect deposits and is self-cleaned by the circulation of sludge within the compartment. The result is that the necessary heat can be supplied with about one-half of the energy required for the pipe heaters as used in prior digesters.

The operation of the above apparatus will now be described as applied to the treatment of milk wastes containing cheese whey and curd wash waters, which concentrated wastes have heretofore been found exceedingly difficult to purify efficiently on account of the excessively high B. O. D. and acid concentration thereof. While whey and curd wash water wastes are being fed in, the appropriate air lift device 17 may be kept in action to circulate sludge from the delivery to the entrance end of the initial digestion compartment 1, and the air diffusers 28 in this high temperature compartment may be kept in operation to mix the contents of the compartment. Usually it is not necessary to operate the diffusers in this compartment during periods when wastes difficult of treatment are not being fed in, which periods may be for weeks or months.

The diffusers in compartment 5 however are preferably operated quite steadily since in the form of apparatus shown in Fig. 1 this is the compartment primarily relied upon to supply well activated sludge for recirculation into compartment 1, and the relatively small amount of oxygen thus injected serves to destroy or stabilize digestion inhibiting elements such as phages or enzymes and antigens, and to break up volatile acids. The sludge thus obtained and recirculated is activated in the true sense of developing and maintaining high concentrations of active organisms therein as above mentioned.

The air lift devices 17 provide a ready means of adjusting the relative amounts of sludge in the respective compartments, and thereby controlling the rate of digestion in each compartment as above mentioned. In general the amount of sludge so recirculated will be increased with increase in load on the system, and the amount of sludge will be regulated to decrease progressively in successive compartments, the temperature of the successive stages being also controlled as above mentioned to decrease progressively in successive stages.

The recirculation of activated sludge may be frequently omitted throughout the day, or may take place for periods up to four or five hours or more, depending on the load conditions in the plant. Well activated sludges as obtained from a later stage of treatment as above described also exhibit a substantial buffering action when introduced into the wastes in an earlier stage of treatment, and may be helpful in neutralizing the acidity of raw wastes. I have found for example that by thus recirculating activated sludge, acid wastes of an initial pH of 4.5 may be rapidly buffered and increased to a pH of 6.5 or more, and finally discharged from the digester at a pH of about 8, thus producing a desirably high alkaline effluent without requiring chemical treatments such as have heretofore been used in an effort to increase the pH of highly acid wastes such as cheese whey. In general the recirculation of activated sludge and the aerating effect above referred to, may be regulated to produce a pH in compartment 1 of from about 6.8 to 7.2, increasing up to 8 or 8.5 in the final compartment 6.

The wastes in the initial high temperature stage are at a higher concentration of suspended solids, and the concentration progressively decreases in later stages. In Fig. 3 I have shown a schematic representation of the progress of a digestion process of the character above described, the raw sludge being shown at the left of the figure at 31 as entering a mixing compartment 32 provided with an air diffuser 33 and an air lift device 34 which may be used to recirculate sludge from the bottom of the high temperature compartment 35 back into mixing compartment 32. As indicated in Fig. 3 there is very little separation of the contents of mixing compartment 32 into a lower layer of sludge and an upper layer of liquor.

From compartment 32 the incoming sludge passes through a port 36 into the initial high temperature digestion compartment 35 which is shown as provided with a heater 37 similar to the heater 30 previously described. Compartment 35 is also shown as provided with air diffusers 38. There is also indicated in compartment 35 separation to some extent, of the sludge under treatment into a supernatant body of liquor 39 and a subjacent body or blanket 40 of liquor, as will take place during quiescent periods.

The liquor from compartment 35 then passes through a port 41 into a second stage digestion compartment 42 shown as provided with an air diffuser 43 and an air lift device 44 by means of which sludge activated to some extent may be withdrawn from the bottom of compartment 42 and recirculated back into compartment 35. In compartment 42 a somewhat deeper stratum of supernatant liquor is indicated and a somewhat shallower sludge blanket 46, into which strata the contents of compartment 42 tend to separate.

The liquor 45 in compartment 42 then passes through a port 47 into a third stage compartment 48, shown as provided with an air diffuser 49 and an air lift device 50 by means of which more thoroughly activated sludge may be withdrawn from the bottom of compartment 48 and recirculated back into compartment 35. Also an air lift device 51 is indicated by means of which excess sludge may be withdrawn from the bottom of compartment 48 for disposal.

The liquor in compartment 48 then passes through a port 52 into the final stage digestion compartment 53, shown as provided with an air diffuser 54 and with air lift devices 55 and 56 which recirculate respectively back into compartments 35 and 32. The final compartment 53 is shown as having a still smaller activated sludge blanket 57 which may be completely recirculated back into the system by the air lift devices 55 and 56, purified effluent passing off as indicated at 58.

The disclosure of Fig. 3 should be regarded as schematic in character since treatment tanks spaced apart as indicated in the figure will not have the advantage of the concentric structural arrangement shown in Fig. 1, in affording efficient heat transfer and assisting in the maintenance of the desired temperature gradient between successive digestion stages as is preferred in practicing the invention in its more specific aspects. Heretofore destruction of from 50 to 60% of the volatile solids has been considered excellent in conventional digestion tanks, but with a process as above described it has been found possible to exceed an efficiency of 99% using post aeration as hereinafter described in connection with Fig. 4. With a simple two zone digestion apparatus a reduction of over 95% of the volatile solids and consequent B. O. D. may be obtained on the basis of a detention period of about twelve days, as contrasted to the much longer detention periods of from about twenty to ninety days which have been current in prior art practice.

In the form of apparatus shown in Fig. 4, entering sludge to be treated passes from a conduit 60 into a pretreatment and mixing chamber 61 similar in function to the chamber 3 previously described, and having air diffuser devices 28 similar to those previously described. From chamber 61 the mixed sludge passes through a combined air lift and gravity flow feeding device 22 of the type shown in Fig. 1B, through a pipe 24 into a central initial digestion compartment 62 similar in function to the compartment 1 previously described, and provided with central heater 63 similar to the heater 30. This central compartment is also shown as having air diffusers 28 and an air lift device 17 of the type shown in Fig. 1A for recirculating sludge from the delivery end of compartment 62 back into the entrance portion thereof as previously described in connection with Fig. 1.

The superjacent liquor in compartment 62 flows by gravity through a port 64 into the next successive digestion compartment 65, which has air diffusers 28 and an air lift device 17 by which sludge from the delivery end of compartment 65 may be recirculated back into the initial digestion compartment 62.

From compartment 65 the superjacent liquor flows through a port 66 into the next successive digestion compartment 67, having air diffusers 28 and an air lift device 17 by which sludge from the delivery portion of compartment 67 may be recirculated back into compartment 62.

From digestion compartment 67 the superjacent liquor passes through a port 68 into the next successive digestion compartment 69, having air diffusers 28 and an air lift device 17 by which highly activated sludge from compartment 69 may be recirculated back into the initial digestion compartment 62. In the form of the invention shown in Fig. 4 excess sludge is discharged from the system by a further air lift device 17a withdrawing sludge from compartment 69 and delivering same for disposal through a conduit 17b similar to the conduit 20 of Fig. 1A.

From compartment 69, as shown in Fig. 4, the superjacent liquor passes through a port 70 into the next successive digestion compartment 71 also having air diffusers 28 as shown and an air lift device 17 by which sludge may be recirculated back from compartment 71 into compartment 69.

From compartment 71 the superjacent liquor passes through a port 72 into compartment 73 which is the final digestion compartment of the apparatus shown in Fig. 4, this compartment also having air diffusers 28 and an air lift device 17 by which sludge may be recirculated from compartment 73 back into compartment 67.

The apparatus of Fig. 4 provides a concentric arrangement of compartments in what may be termed three different temperature zones of treatment, the zone of highest temperature comprising the central compartment 62 where the temperature as previously described is preferably maintained between 108° and 102° F. by appropriate regulation of heater 63; and an intermediate temperature zone including the compartments 65, 67 and 69 where the temperature will be of the order of 100° to 90° F.; and an outer lower temperature zone including the compartments 71 and 73, where the temperature will be somewhat under 90° F.

The highest rate of volatile solids destruction or digestion will occur in the central high temperature zone where a substantial portion of the volatile solids will be volatilized and stabilized. Gases consisting principally of methane and carbon dioxide will be liberated at a relatively high rate in this zone. The progress of the digestion process and the regulation thereof by admission of air through diffusers 28, and the recirculation of sludge through the air lift devices 17 should be in general as previously described in connection with Fig. 1.

In the apparatus of Fig. 4 the superjacent liquor flows from the final digestion compartment 73 through a port 74 into an aerating compartment 75 provided with air diffusers 28. The solids and liquid making up the effluent from compartment 73 are particularly adaptable to the rapid and complete volatilization of unstable matter by admixture with oxygen, and only a relatively small quantity of oxygen will be required for this purpose. From compartment 75 the liquor passes through a port 76 into a settling chamber 77 into the bottom of which the stabilized solids settle in the form of a blanket, and from which this sludge may be recirculated back into compartment 65 by an air lift device as indicated in Fig. 4. The purified effluent from compartment 77 may pass off through a conduit 78, thus constituting the final effluent of the entire system. An apparatus of the type shown in Fig. 4, including the final aerating and settling chambers 75 and 77 is particularly desirable in installations where the apparatus provides the entire purification treatment and a maximum degree of clarification and purification is desired in the effluent.

While the invention has been disclosed as carried out by the preferred forms of apparatus above described, it should be understood that changes and variations may be made both in respect to the apparatus and the specific process steps employed without departing from the invention in its broader aspects, and within the scope of the appended claims.

I claim:

1. A process of the character described of digesting wastes in successive stages, which includes maintaining anaerobic conditions in said stages but nevertheless aerating the wastes during treatment in limited amount to oxidize toxic products of digestion and in amount consistent with the maintenance of such anaerobic conditions, and recirculating thus aerated sludge from a later stage of digestion treatment back into the wastes contained in an earlier stage of digestion treatment.

2. A process of the character described of digesting wastes in successive stages, which includes maintaining anaerobic conditions in said stages and subjecting the sludge content of the waste in a later stage of digestion treatment to the action of an air lift column to recirculate aerated sludge therefrom back into the wastes contained in an earlier stage of digestion treatment and oxidize toxic products of digestion, the air being introduced as aforesaid in limited amount consistent with the maintenance of such anaerobic conditions.

3. A process of the character described of digesting wastes in successive stages, which includes maintaining the wastes in an earlier stage at a temperature of the order of 108°-102° F., and maintaining the wastes in a plurality of later stages at progressively lower temperatures.

4. A process of the character described of digesting wastes in successive stages, which includes maintaining the wastes in an initial digestion stage at a temperature of the order of 108-102° F., and maintaining the wastes in a later stage at lower temperature.

5. A process of the character described of digesting wastes in successive stages, which includes maintaining the wastes in an initial digestion stage at a temperature of the order of 108-102° F., and passing the wastes through successive subsequent stages maintained at a temperature of the order of 100-90° F., and passing the wastes through a further digestion stage maintained at a temperature under 90° F.

6. A waste digester of the character described having a digestion compartment provided with means for conducting wastes thereto for treatment, means for heating the contents of said compartment, and a second digestion compartment abutting the enclosing wall of said first mentioned compartment in contiguous heat absorbing relation thereto, to produce a lower temperature in said second compartment than in said first mentioned compartment, said last mentioned compartment being connected in series with said first mentioned compartment to afford successive digestion stages of treatment, means being provided for feeding wastes from said first mentioned compartment to said second mentioned compartment.

7. A waste digester of the character described having a digestion compartment provided with means for conducting wastes thereto for treatment, means for heating said compartment, and a plurality of additional digestion compartments located in contiguous heat absorbing relation to the enclosing wall of said first mentioned compartment, said last mentioned compartments being connected in series with said first mentioned compartment to afford successive digestion stages of treatment, means being provided for feeding wastes from said first mentioned compartment successively through said second mentioned compartments and an air lift device constructed to recirculate sludge from the lower portion of one of said last mentioned compartments back into said first mentioned digestion compartment.

8. A waste digester of the character described having a digestion compartment provided with means for conducting wastes thereto for treatment, and a plurality of additional digestion compartments located in contiguous heat absorbing relation with the enclosing wall of said first mentioned compartment, said last mentioned compartments being connected in series with said first mentioned compartment to afford successive digestion stages of treatment, and means located within said first mentioned digestion compartment for imparting heat to the contents thereof, said additional compartments being disposed in contiguous heat absorbing relation with said first mentioned compartment to produce temperatures in said last mentioned compartment lower than in said first mentioned compartment, means being provided to feed wastes from said first compartment successively through said last mentioned compartments.

9. A waste digester of the character described having an inner digestion compartment provided with means for conducting wastes thereto for treatment, a heater located in said inner digestion compartment, a plurality of additional digester compartments at least partially enclosing said first mentioned compartment and connected in series therewith, and a plurality of further digestion compartments at least partially enclosing said second mentioned compartments and also connected in series therewith, said additional digestion compartments being located in contiguous heat absorbing relation with said inner digestion compartment, and said further digestion compartments being located in contiguous heat absorbing relation with said additional compartments.

10. A concentrated waste digester of the character described having an inner digestion compartment provided with means for conducting concentrated wastes thereto for treatment, a heater located in said inner digestion compartment and a plurality of additional digestion compartments at least partially enclosing said first mentioned compartment, said last mentioned compartments being connected in series with said first mentioned compartment, thereby to afford successive digestion stages of treatment, said digester having air lift means for recirculating sludge from one of said later stage compartments back into an earlier stage compartment.

11. A waste digester of the character described having at least two digestion compartments connected in series to afford successive digestion stages of treatment, means for aerating waste obtained in a later stage compartment in limited amount to remove toxic products of digestion and in amount consistent with the maintenance of anaerobic conditions in said digester, said digester including means for recirculating aerated sludge from a later stage compartment back into an earlier stage compartment.

12. A waste digester of the character described having an inner digestion compartment provided with means for conducting waste thereto for treatment, a plurality of additional digestion compartments at least partially enclosing said first mentioned compartment, and further digestion compartments at least partially enclosing said second mentioned compartments, said second mentioned compartments being connected in series with the first mentioned compartment and said third mentioned compartments being connected in series with the second mentioned compartments, said first mentioned compartment being provided with a heater, said second mentioned compartments being positioned in contiguous heat-absorbing relation to said first mentioned compartment, and said third mentioned compartments being positioned in contiguous heat-absorbing relation to said second mentioned compartments.

13. A waste digester of the character described, having an initial stage digestion compartment and a plurality of later stage digestion compartments grouped about said first mentioned compartment and connected in series therewith, air lift means being provided for recirculating sludge from each of said later-stage compartments back into an earlier stage compartment, means being provided for feeding wastes from said initial stage digestion compartment successively through said later stage digestion compartments.

14. A process of the character described of digesting wastes in successive stages, which includes maintaining the wastes in an initial digestion stage at a temperature of the order of 108–102° F., maintaining wastes in a later stage at lower temperature, and recirculating sludge obtained in a later stage back into the wastes contained in an earlier stage of treatment.

15. A process of the character described of digesting wastes in successive stages, which includes maintaining the wastes in an initial digestion stage at a temperature of the order of 108–102° F., maintaining the wastes in a later stage at lower temperature, aerating sludge obtained in a later stage, and recirculating the aerated sludge back into the wastes contained in an earlier stage of treatment.

16. A multi-stage waste digester of the character described having an initial digestion compartment provided with means for conducting wastes thereto for treatment, at least three additional digestion compartments connected in series with said first mentioned compartment, and means for recirculating sludge obtained in various later stages of treatment back into the wastes contained in various earlier stages of treatment.

17. A concentrated waste digester of the character described having a digestion compartment provided with means for conducting wastes thereto for treatment, a second digestion compartment connected in series with said first mentioned compartment, said digester having means for maintaining said first mentioned compartment at a temperature of the order of 108–102° F. and said second mentioned compartment at a lower temperature.

18. A concentrated waste digester of the character described having an inner digestion compartment provided with means for conducting wastes thereto for treatment, a plurality of additional digester compartments at least partially enclosing said first mentioned compartment and connected in series therewith, and a plurality of further digestion compartments at least partially enclosing said second mentioned compartments and also connected in series therewith, said digester including means for maintaining said inner compartment at a temperature of the order of 108–102° F., said additional compartments at a temperature of the order of 100–90° F., and said third mentioned compartments at a still lower temperature.

19. A concentrated waste digester of the character described including a digestion compartment provided with means for conducting wastes thereto for treatment, a second digestion compartment connected in series with said first mentioned compartment to afford successive digestion stages of treatment, a top wall overlying said compartments, and an air lift device constructed to recirculate sludge from said second mentioned to said first mentioned compartment, said air lift device having offtake conduit means for conducting gaseous products therefrom to a point exterior of said top wall.

20. A concentrated waste digester of the character described including a digestion compartment provided with means for conducting wastes thereto for treatment, a second digestion compartment connected in series with said first mentioned compartment to afford successive digestion stages of treatment, a top wall overlying said compartments, and an air lift device constructed to recirculate sludge from said second mentioned to said first mentioned compartment, said air lift device having offtake conduit means for conducting gaseous products therefrom to a point exterior of said compartments and also affording a liquid seal between the upper spaces of said compartments and the space exterior to said top wall.

21. A process of the character described of digesting wastes in successive stages, which includes maintaining the wastes in an initial digestion stage at the temperature of the order of 108–102° F. and maintaining the wastes in subsequent stages at lower temperatures, and recirculating sludge between later and earlier stages to cause the solids concentration of the waste to progressively decrease and the pH thereof to progressively increase as said wastes pass through said successive stages.

EDWARD B. MALLORY.

REFERENCES CITED

The following references are of record in the file of this patent:

UNITED STATES PATENTS

| Number | Name | Date |
| --- | --- | --- |
| 1,122,156 | Pratt | Dec. 22, 1914 |
| 1,929,179 | Piatt | Oct. 3, 1933 |
| 1,963,581 | Heukelekian | June 19, 1934 |
| 2,029,702 | Buswell et al. | Feb. 4, 1936 |
| 2,190,598 | Fischer | Feb. 13, 1940 |
| 924,285 | Smith | June 8, 1909 |
| 2,262,576 | Durdin, Jr. | Nov. 11, 1941 |
| 2,263,451 | Bach | Nov. 18, 1941 |
| 1,247,540 | Jones | Nov. 20, 1917 |
| 1,717,780 | Imhoff | June 18, 1929 |
| 1,790,975 | Dallas et al. | Feb. 3, 1931 |
| 1,360,149 | Schmidt | Nov. 23, 1920 |
| 757,448 | Friesdorf | Apr. 19, 1904 |
| 499,583 | Powers | June 13, 1893 |
| 634,423 | Cameron et al. | Oct. 3, 1899 |
| 2,027,370 | Currie | Jan. 14, 1936 |
| 633,066 | Brewer | Sept. 12, 1898 |
| 1,700,722 | Imhoff | Jan. 29, 1929 |
| 584,736 | Goodhue | June 15, 1897 |
| 1,381,615 | Beeby | June 14, 1921 |
| 2,348,126 | Green | May 2, 1944 |
| 1,139,024 | Frank | May 11, 1915 |
| 1,123,011 | Ripley | Dec. 29, 1914 |

FOREIGN PATENTS

| Number | Country | Date |
| --- | --- | --- |
| 389,159 | France | June 19, 1908 |
| 436,764 | France | Feb. 1, 1912 |
| 140,639 | Switzerland | Oct. 1, 1930 |
| 13,400 | Great Britain | 1897 |
| 441,851 | Germany | Mar. 16, 1927 |
| 492,809 | Germany | Feb. 13, 1930 |
| 389,159 | France | Sept. 2, 1908 |